Figure 1:
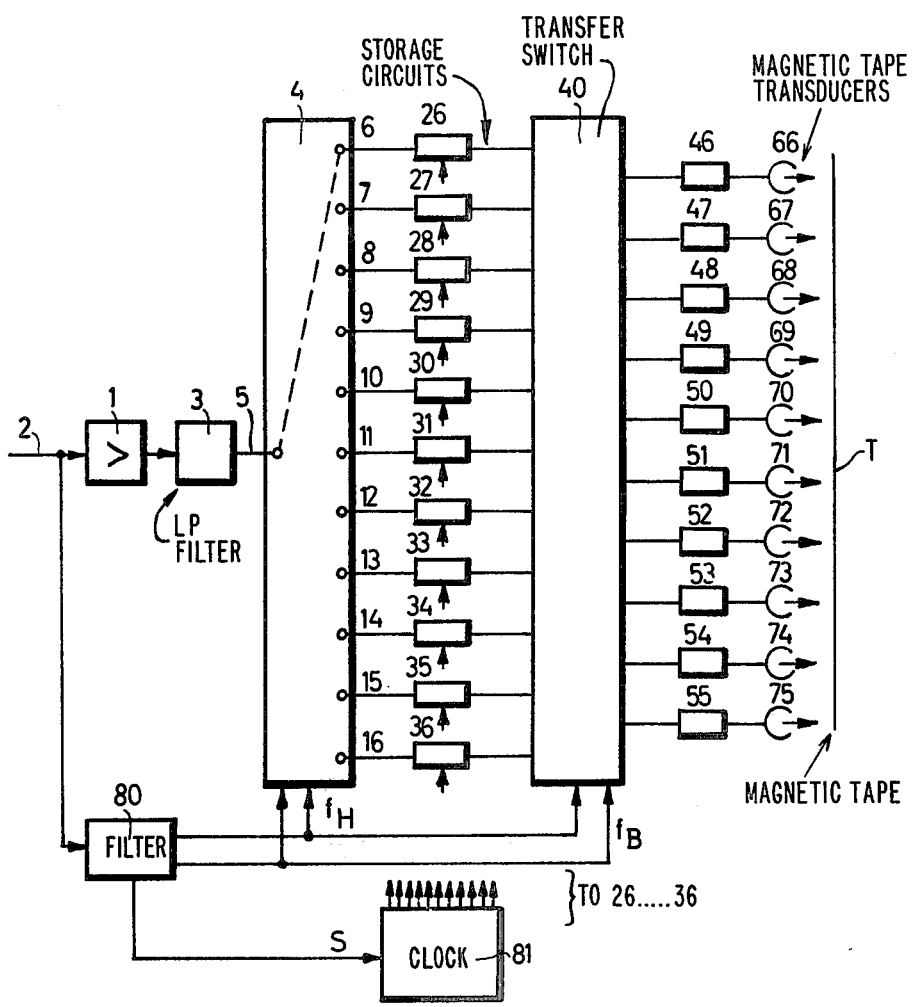

United States Patent [19]

Bock

[11] 4,222,078

[45] Sep. 9, 1980

[54] METHOD AND APPARATUS FOR RECORDING OF WIDE BAND SIGNALS, PARTICULARLY VIDEO SIGNALS

[75] Inventor: Gert Bock, Seeheim, Fed. Rep. of Germany

[73] Assignee: Robert Bosch GmbH, Stuttgart, Fed. Rep. of Germany

[21] Appl. No.: 948,478

[22] Filed: Oct. 4, 1978

[30] Foreign Application Priority Data

Oct. 8, 1977 [DE] Fed. Rep. of Germany ....... 2745337

[51] Int. Cl.² .............................................. H04N 5/79
[52] U.S. Cl. .......................................... 360/9; 360/23
[58] Field of Search ..................... 360/9, 8, 33, 23, 22, 360/36; 365/221, 239

[56] References Cited

U.S. PATENT DOCUMENTS 3,806,640   4/1974   Furukawa .............................. 360/23

FOREIGN PATENT DOCUMENTS 2237255  7/1971  Fed. Rep. of Germany ............. 360/23

Primary Examiner—John H. Wolff
Assistant Examiner—Alan Faber
Attorney, Agent, or Firm—Frishauf, Holtz, Goodman & Woodward

[57] ABSTRACT

To provide for narrow band storage of wide band signals, a dynamic memory e.g. a tape has a plurality of storage tracks, and storage arrangements which are present as one more than the number of storage tracks. Each storage arrangement includes a storage circuit. A first transfer switching system temporally subdivides the broad band signals and applies them to the various storage circuits. A second transfer switching system provides for cyclical connection of the storage circuits to the tracks of the magnetic tape. The signals to be stored are cyclically applied to the inputs of the storage circuits by the first transfer switching system and read out therefrom in a longer time interval, the time stretching factor corresponding to the number of storage circuits less one. To increase the storage density on the tape, the second transfer switching system connects the storage circuits, cyclically, with a number of transducers for magnetic tape memory which is one less than the number of storage circuits.

9 Claims, 2 Drawing Figures

METHOD AND APPARATUS FOR RECORDING OF WIDE BAND SIGNALS, PARTICULARLY VIDEO SIGNALS

REFERENCE TO RELATED PUBLICATION

German Published Application DE-AS 22 37 255.

The present invention relates to a method and to a system to store or record broad band signals, particularly to storage or recording of video signals.

BACKGROUND AND PRIOR ART

It has previously been proposed to store or record broad band signals, particularly video signals, by dividing the signals sequentially, cyclically in n groups and to read-in the thus divided signals, in groups, into a memory having n memory circuits. The signals are then read out in time intervals which are longer than the time intervals of the read-in cycle, for subsequent recording in a recording carrier having a plurality of channels.

Systems of this type are used in order to permit recording of broad band signals in comparatively simple and inexpensive apparatus to enable recording of video signals without excessive requirements of equipment. This particularly appropriate for the recording of video signals. U.S. Pat. No. 3,806,640, Furukawa, to which German Published Patent Application DE-AS 22 37 255 corresponds discloses a system and a method to process video signals as described above. The system, as disclosed, uses a known arrangement of four memory circuits. The video signal is divided into four signal groups. The memory circuits then record the four signal groups, each in a separate channel, for subsequent recording in four separate channels.

Known electronic memory circuits have the characteristic that, during recording with a predetermined clock frequency, it is not possible to read out the recorded information at a different clock frequency. This characteristic has the result that the frequency of any video signal portion recorded in a predetermined channel will correspond only to a third of the original frequency of the video signal. Due to the periodically interrupted read-out process, each recording track associated with a predetermined recording channel will have gaps therein which decreases the effective storage density which can be obtained.

THE INVENTION

It is an object to increase the storage capacity of memory elements and recording devices and to prevent gaps therein in which no information is recorded.

Briefly, n storage circuits are provided, and signals are applied by a first transfer circuit to the n storage circuits, having n inputs. A second cyclically operating transfer switch is provided which reads out the signals from n−1 outputs. The output signals of the memory, thus, are divided by means of the second transfer switch to n−1 recording channels.

The arrangement permits time stretching or time extension by a factor of n−1, wherein n is the number of the storage circuits. This arrangement utilizes storage capacity of a recording carrier without gaps.

The arrangement, when applied to recording of video signal is preferably so arranged that the transfer circuit is synchronized with vertical synchronization pulses so that the beginning of a half frame or a full frame of a TV image is always associated with a predetermined channel.

DRAWINGS

Illustrating a preferred example, wherein

Figure 2:
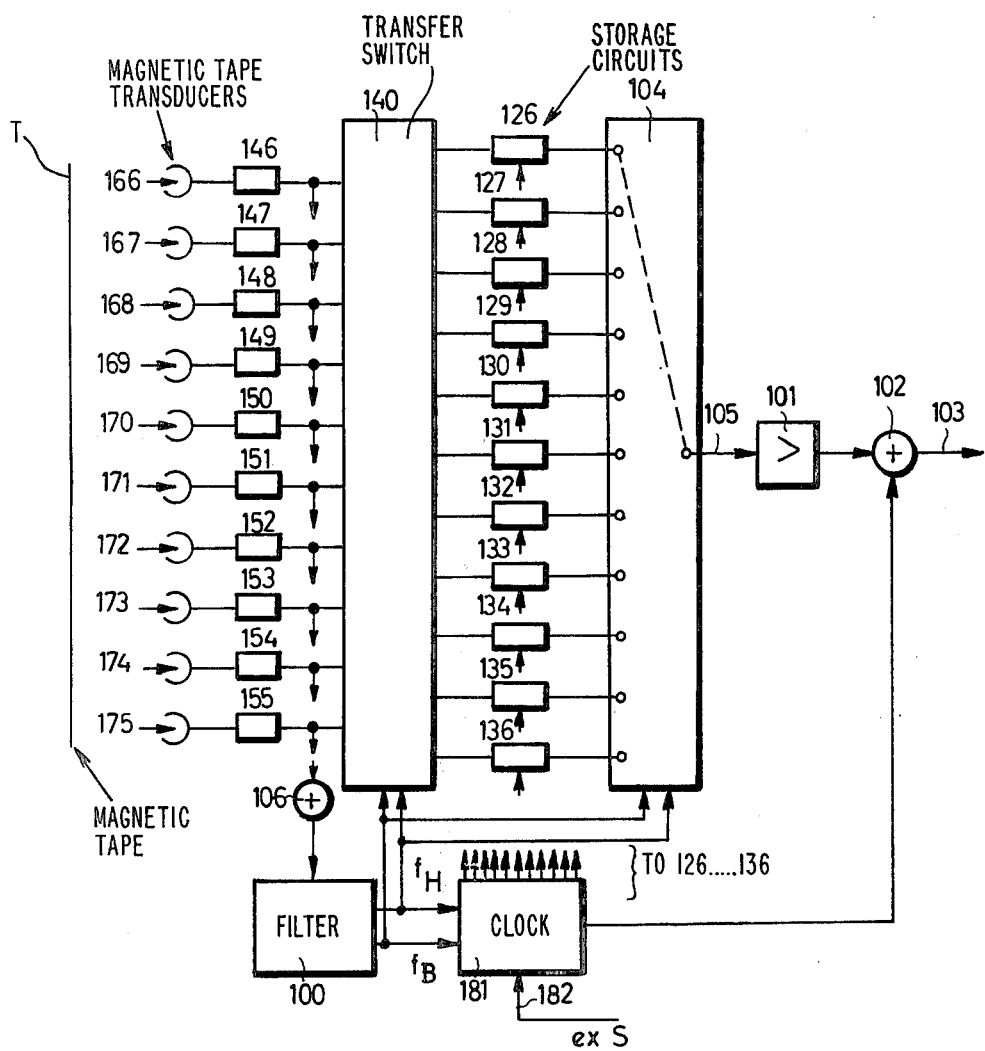

FIG. 1 is a schematic block circuit diagram of an example to record a broad band signal in multiple tracks on a magnetic tape; and FIG. 2 is a highly schematic block diagram of an example for reproduction of the signal recorded in accordance with FIG. 1.

Recording—with reference to FIG. 1: An amplifier 1 is connected to receive the mixed signal applied over incoming bus 2. The output of amplifier 1 is connected to a low-pass filter 3 which, in turn, is connected to the input 5 of a first transfer switch 4. The transfer switch 4 is so arranged that it connects the input 5, selectively, to one of eleven output circuits 6, 7, 8 . . . 16. Each one of the output 6 . . . 16 of the transfer circuit 4 is connected to one corresponding input of a storage or memory circuit 26, 27, 28 . . . 36. The output of the respective storage or memory circuits 26 . . . 36 are respectively connected to the input of a second transfer switch 40, which has as many inputs as storage circuits 26 . . . 36 are provided, in the present example eleven inputs. The number of outputs of the transfer switch 40, however, is one less than the number of inputs. In the present example, thus, the number of inputs n=11; the number of outputs n−1=10. Each output of the second transfer circuit 40 is connected to a signal processing stage 46, 47 . . . 55, each of which is connected to a respective magnetic recording head 66, 67 . . . 75, for recording the processed signal on a respective track of a magnetic tape T, shown schematically. The signal processing circuits 46 . . . 55 may include amplifiers, wave-shaping circuits, and the like.

The signal applied over bus 2 is additionally applied to an amplitude filter 80 having two outputs, one for a signal train $f_H$, corresponding to horizontal line frequency, and one for a signal train $f_B$, corresponding to the frame repetition rate frequency. Both outputs are connected with respective control inputs of the first and second transfer switches 4 and 40, respectively. The filter 80 additionally provides a clock frequency/synchronization signal S to control a clock generator 81 to generate, at the input to the clock generator 81, a memory synchronization signal. The clock generator 81 has n outputs, that is, as many outputs as memory circuits 26, 27 . . . 36 are provided, in the present case eleven outputs. Each control input of the respective memory circuit is connected to a respective control output from the clock generator 81.

Operation—Recording: The video signal on bus 2 is amplified in amplifier 1 and applied to low-pass filter 3. It is then connected to the input 5 of the transfer switch 4. The video signal simultaneously is filtered in the filter 80 and the line frequency and frame frequency synchronization signals are separated out. Both signal trains are applied to the control input of the transfer switch 4. The transfer switch 4 sequentially connects the signals on input 5 with the respective outputs 6, 7 . . . 16 in synchronism with the line frequency synchronization signals $f_H$ derived from filter 80, and applied to the respective control input. Thus, the respective memory circuits 26, 27 . . . 36 are sequentially connected with the outputs 6 to 16, in synchronism with the frequency $f_H$ applied to the control input of the first transfer switch 4. Consequently, the continuously appearing video signal, applied at bus 2, is divided into eleven groups of signals, each signal group in any one channel appearing therein at 1/n, that is 1/11 of the line frequency. The filter circuit 80 also provides memory synchronization signal trains S for the clock generator 81 which has n outputs, that is, as many outputs as there are memory circuits 26 ... 36.

The memory circuits 26 ... 36 are analog memories. The usual analog memories do not have the characteristic that they permit read-out of data stored therein simultaneously with read-in, in which the read-out is done at a speed different from the read-in speed. While the memory circuits 26 ... 36 can be occupied by the data applied over bus 2 and supplied to the respective memory circuits from input 5 over transfer switch 4, read-out, at a stretched or extended time, can be effected only subsequent to read-in, and must be terminated before input of the next information block is to occur.

Gaps in the recording of the information on magnetic tape by the respective recording heads 66, 67 ... 75 on the respective channels, and consequent decrease in the recording density of the tape, are prevented by the provision of the common second transfer circuit 40 which has output terminals which correspond to $n-1$, that is, one less than the number of inputs thereto. This transfer circuit 40 is so controlled by the frequencies $f_H$ and $f_B$, applied to its control input, that, cyclically, the connection between the memory circuits 26 ... 36 and the signal processing stages 46 ... 55 is shifted by one. This, then, permits stretching read-out upon reading the content of the memory in the memory circuits to such an extent that there is some overlap with the time for recording of the subsequent information sequence in the next channel. For example, in the first cycle, the output of the memory circuit 26 is connected with the input of the signal processing stage 46, the memory circuit 27 with the processing stage 47 and so on, until the memory circuit 35 is reached, which is connected with the signal processing stage 55 by the transfer switch 40. The memory circuit 36, after rapid read-in by coupling the memory circuit 36 with the low-pass filter 3 and through the transfer switch 4 is connected, at the next cycle, with the signal processing stage 46; the memory circuit 26, at the next cycle, is then connected with the signal processing stage 47, the memory circuit 27 with the signal processing stage 48, and so on, that is, shifted by one. At the third cycle, the shift between memory circuits 26, 27 ... 36 and the signal processing stages 46 ... 55 will be by two stages, and so on. Storage area on tape, on which the tracks are recorded, is decreased and the respective tracks which are written on by the heads 66, 67 ... 75 will not have gaps of recorded information appear therein.

Reproduction circuit, FIG. 2; The circuit of FIG. 2, basically, is the inverse of the circuit of FIG. 1 and analogous thereto. The reproducing heads 166, 167 ... 175, which can be identical to the recording heads, are connected to signal processing stages 146 ... 155, which, for example, include reproduction amplifiers and wave-shaping stages. The transfer circuit 140, which can be identical to transfer circuit 40, is connected between the outputs of the signal processing stages 146 and inputs to memory circuits 126, 127 ... 136. The difference between the circuits 40 and 140 essentially is that the inputs and outputs are interchanged. The signals scanned by the recording heads 166, 167 ... 175 are recorded on ten tracks and transferred by the transfer circuit 140 to eleven memory circuits 126 ... 136, corresponding essentially to the memory circuits 26 ... 36 of FIG. 1. The memory circuits 126 ... 136 compress the signals which were extended, in time, to the original time base under control of clock generator 181. They are then combined by the transfer switch 104 and applied to an output 105 to provide a continuous output signal. Transfer switch 104 corresponds, essentially, to the first transfer switch 4 of FIG. 1, except that again, the inputs and outputs are interchanged. Amplifier 101 amplifies the signal to the necessary level so that it can be combined with synchronization signals applied from the clock generator 181. Combination is effected in a combining or adding circuit 102 to provide the reconstituted output on output bus 103.

The control or clock signals for the memory circuits 126, 127 ... 136 are obtained by adding signals derived from the reproducing amplifiers 146, 147 ... 155 in an adder circuit 106 and applying the thus derived signals to a filter or separating stage 100. The synchronization signal, which has a time error associated therewith, is coupled with the read-in clock in the clock signal generator 181, provided for the memory circuits 126, 127 ... 136. A fixed synchronization signal applied over terminal 182 controls start of the read-out cycle to thereby provide for compensation of the time error.

Looked at from another point of view, the invention is directed to using a 10-track magnetic tape to its fullest extent by providing one additional storage or memory circuit 36 (FIG. 1), 136 (FIG. 2) and dividing the incoming signal into one more signal groups than there are recording tracks. Thus, for a given track number m, there should be $m+1$ storage circuits, and the temporal division of the signal should be into $m+1$ groups.

I claim:

1. In a method of recording broad band signals on magnetic tape (T) in a plurality of m tracks, the step of
    temporally sequentially dividing the signals into $m+1$ signal groups;
    storing the $m+1$ signal groups in $m+1$ memory circuits (26, 27 ... 36) in sequential time intervals of predetermined duration;
    sequentially reading out the $m+1$ signal groups from the $m+1$ memory circuits in respective time intervals which are longer than the storage time intervals;
    and providing recording signals for subsequent recording of the signals on the plurality of tracks on the magnetic tape
    wherein, in accordance with the invention,
    the step of sequentially reading out the signal groups from the $m+1$ memory circuits comprises the step of switching the signals recorded in the $m+1$ memory circuits sequentially to m tracks to provide m recording signals for recording on the m tracks of the tape,
    wherein the $(m+1)$th signal will be recorded at one of the m tracks of the tape at a later time, and at a position thereon shifted from the position of the signal recorded on said track during recording of the first to the m-th signal.

2. In combination with the method of claim 1, a method to reconstitute and reproduce the m signals recorded on m tracks of the magnetic tape on m channels, including the steps of
    deriving m signals;

applying said m signals cylically to m+1 storage devices;

reading out said m+1 storage devices in sequential time intervals corresponding to said time intervals;

and compensating time base errors by controlling said timed intervals and the sequence thereof.

3. Method according to claim 2, wherein the step of compensating said time base errors comprises the step of synchronizing the rate of read-out of said m+1 storage devices with a synchronization signal (exS).

4. Method according to claim 1, for recording of video signals, wherein the step of switching the signals into the m+1 memory circuits comprises the step of synchronizing said switching step with the vertical synchronization pulses ($f_B$) and storing the beginning of selected frames of the video signals in predetermined channels or tracks of the recording tape (T).

5. Apparatus to transduce broad band signals for recording on a plurality of parallel tracks on a recording tape (T)
having first transfer switch means (4) dividing the signals into temporally successive m+1 signal groups;
m+1 storage circuits (26, 27 ... 36) storing the respective groups of signals;
storage timing control means (80, 81) controlling the rate of sequential storage of said m+1 signal groups in said m+1 storage circuits to store each said signal groups during sequential time intervals of a predetermined duration;
and comprising, in accordance with the invention,
m transducing means (46, 47 ... 55; 66, 67 ... 75) to record the stored signals on m tracks of the tape (T);
second transfer switch means (40) having m+1 inputs, one each connected to the m+1 storage circuits, and m outputs, one each connected to a respective transducer means for recording on the m tracks or channels of the recording tape;
and reading timing control means (80) controlling said second transfer switch means (40) for sequential cyclical connection, and hence read-out of the data stored in said m+1 storage circuits at a rate different from the storage rate and providing for read-out timing intervals which are longer than the storage timing intervals.

6. Apparatus according to claim 5, to record video signals wherein the storage timing control means and the reading timing control means comprises a filter circuit deriving horizontal and vertical synchronization signals from a video signal applied to said first transfer switch means, and a clock circuit (81) controlled by said synchronization signals.

7. Apparatus according to claim 5, wherein the storage timing control means and the reading timing control means comprises a single circuit system (80, 81) forming both said timing means and controlling both said transfer switch means (4, 40).

8. Apparatus according to claim 5, further comprising reproduction apparatus including
m transducer means (166, 167 ... 165) reading the m tracks on the tape (T);
reading transfer switch means (140) having m inputs, connected to respective tape transducer means and further having m+1 outputs;
m+1 reading storage circuit means (126, 127 ... 136), connected to the respective outputs of the reading transfer switch means (140);
and signal reconstituting switch means (104) scanning the outputs of said reading storage circuit means (126, 127 ... 136) to reconstitute the signals applied to said first transfer switch means (4);
and receiving timing means (106; 100, 181) having a synchronization input (182) to correct time base errors.

9. Apparatus according to claim 5, for recording of video signals, wherein the storage timing control means (80, 81) control the rate of storage of said m+1 signal groups in said m+1 storage circuits in step with and under control of the horizontal and vertical synchronization pulses of the video signal to store the beginning of selected frames of the video signals in predetermined channels or tracks of the recording tape.

* * * * *